(12) United States Patent
Kolar

(10) Patent No.: US 6,700,806 B2
(45) Date of Patent: Mar. 2, 2004

(54) UNIDIRECTIONAL THREE PHASE PULSE CONTROLLED RECTIFIER SYSTEM WITH FAILED PHASE VOLTAGE OPERATION

(75) Inventor: Johann W. Kolar, Vienna (AT)

(73) Assignee: Delta Energy Systems (Switzerland) AG, Bern (CH)

( * ) Notice: Subject to any disclaimer, the term of this patent is extended or adjusted under 35 U.S.C. 154(b) by 0 days.

(21) Appl. No.: 10/169,578

(22) PCT Filed: Jan. 5, 2001

(86) PCT No.: PCT/CH01/00005
§ 371 (c)(1),
(2), (4) Date: Oct. 1, 2002

(87) PCT Pub. No.: WO01/50583
PCT Pub. Date: Jul. 12, 2001

(65) Prior Publication Data
US 2003/0039134 A1 Feb. 27, 2003

(30) Foreign Application Priority Data
Jan. 5, 2000 (AT) ................................................ 9/2000

(51) Int. Cl.⁷ ............................................. H02M 7/217
(52) U.S. Cl. ......................................... 363/89; 363/127
(58) Field of Search .......................... 363/89, 125, 126, 363/127

(56) References Cited

U.S. PATENT DOCUMENTS 4,384,321 A * 5/1983 Rippel ........................ 363/124
6,031,739 A * 2/2000 He et al. ....................... 363/89
6,043,997 A * 3/2000 He et al. ....................... 363/89
6,122,183 A * 9/2000 He et al. ....................... 363/89
6,385,057 B1 * 5/2002 Barron ......................... 363/65

FOREIGN PATENT DOCUMENTS

AT           404 415 B       11/1998    .......... H02M/7/217
GB          2 294 165 A       4/1996    ............. H02J/3/18

OTHER PUBLICATIONS

Kolar et al., IEEE, 16 pages Jun. 6, 1999, "Status of the Techniques of Three Phase Rectifier Systems with low Effects on the Mains".

* cited by examiner

Primary Examiner—Jeffrey Sterrett
(74) Attorney, Agent, or Firm—Birch, Stewart, Kolasch & Birch, LLP

(57) ABSTRACT

An apparatus for converting a three-phase voltage system to a DC voltage is supported by an output capacitor and a star circuit. On the input side of filter capacitors is a controllable three-phase bridge and at a positive output of the bridge circuit, a current-stabilizing inductance is included, which, in conjunction with a step-up controller diode and a step-up controller transistor, forms a DC voltage/DC voltage step-up controller which is integrated in the converter structure. The phase arms of the three-phase bridge have an identical structure and their conductance state can be controlled by control switches. In order to produce an output voltage from the system which is below the mean value of the maximum output voltage of the bridge circuit, the step-up controller transistor remains in the switched-off state, and a voltage value which is above the maximum output voltage is formed.

4 Claims, 1 Drawing Sheet

Figure 1:
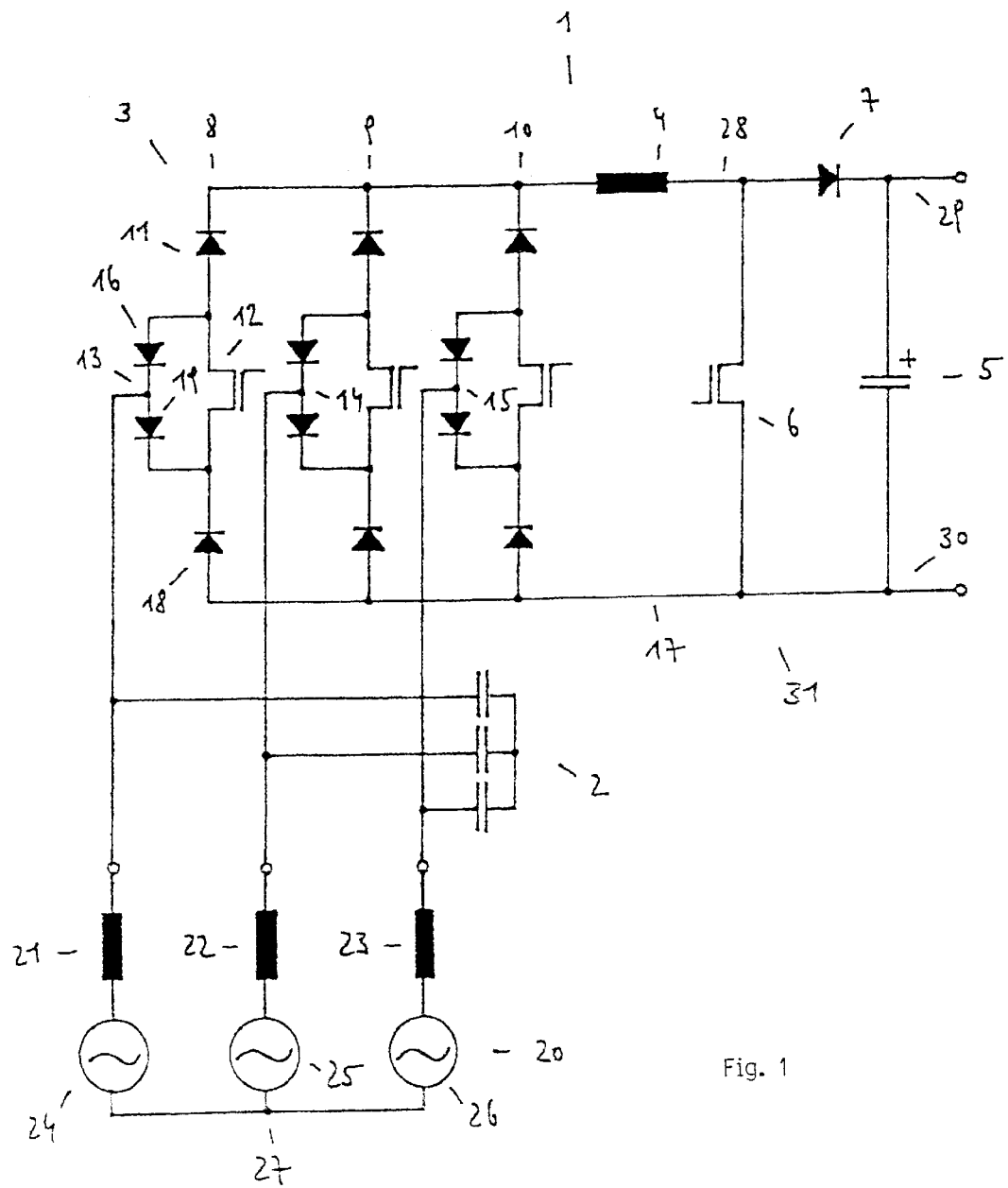

UNIDIRECTIONAL THREE PHASE PULSE CONTROLLED RECTIFIER SYSTEM WITH FAILED PHASE VOLTAGE OPERATION

This application is the national phase under 35 U.S.C. §371 of PCT International Application No. PCT/CH01/00005 which has an International filing date of Jan. 5, 2001, which designated the United States of America.

The invention relates to an apparatus for conversion of three-phase power to DC power which, after filtering of switching-frequency spectral components, and even in the event of a single-phase failure, has a sinusoidal profile of the input current and the capability to produce an output voltage which is greater than or less than the peak value of the concatenated power supply system voltage, as is described in the precharacterizing clause of patent claim 1, and to methods for controlling this apparatus.

According to the prior art at the moment, three-phase, pulse-controlled rectifiers with little reaction on the power supply system and without potential isolation generally have a step-up controller characteristic, that is to say the adjustable output voltage is limited at the lower end by the amplitude of the concatenated power supply system voltage. Direct use of such systems, for example for supplying a pulse-controlled inverter system with a variable intermediate-circuit voltage, is thus generally impossible. Furthermore, for systems such as these, the output capacitor must be initially charged during the course of a start-up procedure, and there is no capability for current limiting in the event of an output short circuit.

Known circuits based on step-down controllers admittedly have less implementation complexity, while being restricted to unidirectional power conversion, that is to say they have only one power semiconductor, which can be switched off, per phase, but the output voltage is limited in the upward direction by the concatenated power supply system voltage and, in the event of a single-phase failure, there is no capability to continue operation with a sinusoidal input current and a resistive fundamental frequency power supply system response.

AT 404.415 describes a unidirectional pulse-controlled converter circuit with a wide input voltage range and with a wide output voltage range for a given input voltage, whose implementation likewise requires only one active device which can be switched off per phase, and which allows operation with little reaction on the power system even in the event of a phase failure. However, this system is characterized by a high reverse voltage load on the active devices and has two coupling capacitors with a high current load and two magnetic energy stores per phase, so that it is not possible to take account of the general requirement for industrial electronic systems for a low level of complexity in the power section, or to take account of the requirement for a minimum number of passive components.

The object of the invention is thus to provide a three-phase, pulse-controlled rectifier system in which the power system current has a sinusoidal profile and which has an output voltage range which is not restricted by the concatenated power supply system voltage, in two-phase and three-phase operation, and which does not require any apparatus for initial charging of the output capacitor.

According to the invention, this is achieved by the characterizing features of patent claim 1. Further advantageous refinements of the invention can be found in the dependent claims.

The rectifier system according to the invention may be regarded as being formed by an extension, according to the invention, of the basic structure of a unidirectional three-phase rectifier system, which corresponds to the prior art, with a stabilized output current and/or DC link circuit. The power section of a conventional unidirectional pulse-controlled rectifier system with a current output is formed, in the simplest case, by a voltage-stabilizing, input-side star or delta circuit of filter capacitors, by a three-phase bridge circuit whose conductance state can be controlled by arranging a power semiconductor, which can be turned off, in each phase, and by the current-stabilizing output inductance connected downstream from this bridge.

Each bridge arm of the controllable three-phase bridge has an identical structure and is formed by a positive output diode, which is connected on the cathode side to the output inductance and to whose anode the emitter of the electronic control switch (for example a power transistor) which can be switched off and the anode of a positive input diode, which is connected on the cathode side to the phase input terminal, is connected, and by a negative output diode, which is connected on the cathode side to the collector of the control switch and is connected on the anode side to the negative output busbar, and by a negative input diode, which branches off from the input phase terminal and is likewise connected on the cathode side to the collector of the power transistor. The second terminal of the output inductance is connected to the positive output busbar and, furthermore, an output capacitor which defines the output voltage is generally arranged between the positive and the negative output busbar. One control switch may be switched off in order to prevent current from flowing via the relevant bridge arm while, when the control switch is switched on, that bridge arm has identical characteristics to the bridge arm of a conventional diode bridge. The capability to control the conductance state which this provides may be used to reduce the output voltage of the system in comparison to conventional diode rectification, and in order to reduce the power supply system reactions. As more detailed analysis shows, with appropriate symmetrical-phase control, the output current is split between the input phases such that, after filtering of switching-frequency harmonics by means of the low-pass filter which is formed from the input-side capacitors and the internal power supply system inductance, this results in a sinusoidal power supply system current profile which is in phase with the power supply system voltage. However, the sinusoidal form of the current profile can be maintained only theoretically in the event of a single-phase failure, that is to say with the output inductance having very high inductance values, which are financially unacceptable. Furthermore, in this case, the output voltage range is restricted in the upward direction by the rectified mean value of the remaining concatenated power supply system voltage, that is to say, in some circumstances, it is impossible to maintain the output voltage setting for three-phase operation.

The fundamental idea of the invention is now to avoid these disadvantages by low-complexity integration of a step-up controller stage in the converter structure. For this purpose, a step-up controller diode which is oriented in the direction of the output, is connected between the positive output capacitor terminal and the second terminal of the output inductance and, branching off from the anode of this diode, the emitter of a step-up controller transistor is connected to the negative output voltage rail. The output inductance of the conventional converter carries out the function of the step-up controller inductance. If a voltage which is below the mean value of the maximum output voltage of the controllable diode bridge is intended to be formed at the output of the system, the step-up controller transistor remains switched off, and the operation of the system according to the invention then corresponds to that of a conventional pulse-controlled rectifier. A voltage value above the conventionally maximum achievable output voltage value is achieved by fully sinusoidally driving the three-phase bridge, with a corresponding step-up controller transistor duty ratio. The fundamental operation of the step-up controller in this case corresponds completely to that of a DC voltage/DC voltage step-up controller which is arranged between the diode bridge output and the output capacitor, and therefore does not need to be explained in any more detail.

For three-phase operation, the current in the output inductance is advantageously kept at a constant value. In the event of a single-phase failure, the control transistors for the remaining phases are switched on in those intervals in which the remaining concatenated power supply system voltage is below the output voltage (in the vicinity of the zero crossings). In these intervals, the input current is controlled by the step-up controller to be proportional to the concatenated input voltage. In the subsequent sections of a power supply system cycle in which the input voltage exceeds the output voltage of the system (in the vicinity of the voltage maxima), the step-up controller transistor is switched off, and the current in the output inductance is controlled by appropriately driving the control transistors so as to achieve a continuous progression of the power supply system current and of the input current (from which switching-frequency harmonics have been removed by means of filtering) of the three-phase bridge. (As more detailed analysis shows, the current in the output inductance then follows a profile which is proportional to the square of the input current).

The circuit modification according to the invention thus makes it possible, with relatively little additional complexity, to avoid the major disadvantages of a conventional circuit implementation, that is to say a restricted output voltage range and loss of the sinusoidal form for the power supply system current, in the event of a phase failure. It should also be noted that, despite the step-up controller characteristic, the system can be started up directly, that is to say the initial charge for the output capacitor can be provided by continuously increasing the drive level of the three-phase bridge, starting from an output voltage of zero, with the step-up controller transistor switched off.

Patent claim 2 describes a further advantageous refinement of the invention. As already mentioned, the conductance state of the input-side three-phase bridge is controlled by means of three power transistors, with intervals also occurring in which no voltage is formed at the output of the diode bridge. These time intervals are referred to in the following text as freewheeling intervals. The current which is forced to flow by the output inductance is then passed via the positive output diode, the control transistor and the negative output diode of each bridge arm. Particularly when the output voltage is low, that is to say when the time period during which the freewheeling states are switched on is relatively high, the three voltage drops across the active devices in the current path thus result in relatively high conductance losses. According to the invention this can be avoided by arranging an explicit freewheeling diode between the negative output busbar and the input-side end of the output inductance, which freewheeling diode carries the entire current within the freewheeling intervals and, owing to its relatively low forward-voltage drop, has considerably less forward losses than the series circuit of three active devices, for the same current. A further advantage of this circuit extension according to the invention is that, irrespective of the specific switching states of the control transistors, a closed path is now always available for the stabilized output current at the output of the three-phase bridge, thus also reliably avoiding the occurrence of overvoltages resulting from the control transistors switching in a non-overlapping manner (due to delay times in the signal electronics or in the drive stages).

According to patent claim 3, the output current can also be passed continuously via the diode bridge, when using a control method according to the invention, even without an explicit freewheeling diode. In this case, the associated control transistor remains switched on in intervals which are symmetrical about the maxima of the input phase voltages and have an electrical width of 60°, and the sinusoidal power supply system current profile and the regulation of the output voltage are achieved by pulsing the two other phases. The operation of such control becomes obviously clear, taking account of the fact that, within these intervals, the concatenated voltages which occur with respect to the non-switching phase and the sinusoidal input currents which are to formed on average over one pulse period and which are proportional to the power supply system voltage do not have any change in their mathematical sign, and the system may thus be regarded as a DC voltage/DC voltage step-down controller, which allows sinusoidal modulation of the input current based on a constant output current, and allows the production of a constant output voltage based on a sinusoidally varying unipolar input voltage. With the exception of the retention of the switching state in one phase according to the invention, the control mechanism therefore has no special features, and will not be discussed any further here.

The switching-frequency oscillation (the ripple) of the output current from the diode bridge can be minimized by coordination, according to the invention, of the control of the step-up controller transistor and of the control transistors as claimed in patent claim 4. The current ripple is governed by the positive and negative voltage differences and voltage time integrals which occur across the inductance. If both systems have the same clock frequency and the control process is carried out such that the intervals in which the step-up controller is switched on are symmetrical about the freewheeling intervals of the diode bridge, no voltage occurs across the inductance for the coverage of these switching states, and there is hence no change in the current in the inductance, so that the amplitude of the switching-frequency ripple is relatively low. Furthermore, taking account of the voltage differences which occur for conduction of the step-up controller diode and the switching states of the three-phase bridge forming a bridge output voltage, this clearly illustrates the capability to calculate an optimum phase shift (which leads, for example, to the current ripple having a minimum root mean square value) for the same-frequency control, that is to say in each case covering the freewheeling states, of both subsystems, which is of minor importance since it is linked to a defined voltage step-up ratio and to the relatively high complexity of practical implementation, and will thus not be described in any more detail here.

The invention will be explained in more detail in the following text with reference to a drawing.

FIG. 1 shows the extended basic structure of the power section according to the invention (simplified schematic illustration) of a conventional, unidirectional three-phase, pulse-controlled rectifier system with a stabilized output current, and a DC link circuit.

FIG. 1 shows a three-phase, pulse-controlled rectifier system 1 with a wide output voltage control range, which may be regarded as being formed by the extension according to the invention of a three-phase, pulse-controlled rectifier system, which corresponds to the prior art, formed by an input-side star circuit 2 of filter capacitors, a three-phase diode bridge 3 which can be controlled by power semiconductors which can be turned off, an inductance 4 which stabilizes its output current, and a capacitor 5 which supports the output voltage that is formed, by means of a step-up controller transistor 6 and a step-up controller diode 7.

The bridge arms 8, 9, 10 of the controllable diode bridge 3 have an identical structure and are formed by a positive output diode 11 which is connected on the cathode side to the inductance 4 and to whose anode the emitter of the electronic control switch 12 (which can be turned off and which governs the conductance state of the bridge arm) called a control switch for short in the following text, and the anode of a positive input diode 16, which is connected to the phase input terminal 13, 14 or 15, are connected on the cathode side, and by a negative output diode 18, which is connected on the cathode side to the collector of the electronic control switch 12 and is connected on the anode side to the negative output busbar 17, and by a negative input diode 19 which branches off from the phase input terminal 13, 14 or 15 and is likewise connected on the cathode side to the collector of the control switch 12. The system is operated from a three-phase power supply system, as is illustrated by a star circuit 20 of equivalent voltage sources 24, 25, 26, which are connected to the input terminals 13, 14, 15 via equivalent inductances 21, 22, 23 which represent the internal power supply system inductance, with a star point 27.

Switching off a control switch 12 prevents any current from flowing via the relevant bridge arm 8, 9 or 10 and, when the control switch 12 is switched on, that bridge arm has the same characteristics as the bridge arm in a conventional diode bridge. By way of example, a positive current, that is to say a current flowing physically into the input terminal 13, is then passed via the negative input diode 19, the control switch 12 and the positive output diode 11, and a negative input current is passed via the negative output diode 18, the control switch 12 and the positive input diode 16. The capability to control the conductance state of the three-phase bridge that this provides can be used to reduce the output voltage of the system in comparison to a conventional diode bridge, and to reduce the power supply system reactions. The current which is forced to flow by the output inductance 4 is in this case, in a corresponding manner to the prior art, split between the phase inputs by appropriate symmetrical-phase driving of the control switches 12 such that, after filtering of switching-frequency harmonics by the star circuit 2 of filter capacitors, which branch off directly from the input terminals 13, 14, 15, with a star point 20 and in conjunction with the intrinsic inductances 21, 22, 23 of the power supply system phases, this results in the power supply system phase currents having a sinusoidal profile, which is in phase with the associated power supply system phase voltages 24, 25 or 26.

The fundamental idea of the invention is now to extend this converter structure (which is restricted to step-down controller operation, that is to say it has an output voltage which is below the rectified mean value of the output voltage of the controllable three-phase bridge 3 and is supported by the output capacitor 5) with minimum additional complexity to provide the capability for step-up controller operation. For this purpose, a step-up controller diode 7 which is oriented in the direction of the output is connected between the positive output capacitor terminal 29 and the second terminal 28 of the inductance 4, facing away from the diode bridge 3, and, branching off from the anode of this diode 7, the emitter side of a step-up controller transistor 6 is connected to the negative output voltage rail 17, which is connected to the negative output capacitor terminal 30. In this case, the output inductance 4 of the conventional converter carries out the function of the step-up controller inductance. If an output voltage of the system 1 which is below the mean value of the maximum output voltage of the controllable three-phase bridge 3 is to be formed, the step-up controller transistor 6 remains switched off, and the operation of the system 1 according to the invention corresponds to that of a conventional pulse-controlled rectifier. A voltage value across the output capacitance 5 which is above the conventionally maximum achievable output voltage value is achieved by fully driving the three-phase bridge, with a corresponding duty ratio for the step-up controller transistor 6. According to the basic operation of the DC voltage/DC voltage step-up controller 31 which is now arranged between the diode bridge output and the output capacitor, the current in the inductance 4 is then slightly increased by switching on the step-up controller transistor 6, and this current increase, which corresponds to an increase in the magnetic energy, is dissipated once again by demagnetization of the inductance 4 with respect to the difference between the voltage of the output capacitor 5 and of the diode bridge 3. If the step-up controller transistor 6 is switched on for relatively long periods, this thus results in an output voltage value which is considerably above the output voltage of the diode bridge 3 in the steady state.

The current in the output inductance 4 is advantageously maintained at a constant value, for three-phase operation. In the event of a single-phase failure in the supplying power supply system, the control transistors 12 in the remaining phases remain switched on in those time intervals in which the remaining concatenated voltage is below the output voltage. In these intervals, appropriate control of the relative time for which the step-up controller transistor 6 in the step-up controller 31 is switched on allows the input current to be kept proportional to the rectified, concatenated input voltage that occurs at the output of the bridge circuit 3. In the subsequent sections of a power supply system period in which the input voltage exceeds the output voltage of the system 1, the step-up controller transistor 6 is switched off, and the current in the inductance 4 is controlled by appropriately driving the control switches 12 in those phases which are still active so as to achieve a continuous progression of the power supply system current, that is to say of the input current (from which switching-frequency harmonics have been removed [lacuna] the low-pass filter formed by the filter capacitors 2 and the intrinsic power supply system impedance) of the diode bridge 3, so that the output voltage setting for three-phase operation and the resistive fundamental frequency power supply system response of the system are maintained even in the event of a phase failure.

What is claimed is:

1. An apparatus for conversion of a three-phase voltage system to a DC voltage which is supported by an output capacitor, the negative pole of the output capacitor being connected to a negative output voltage rail, the apparatus comprising:
   a) a star circuit including filter capacitors, the star circuit branching off from phase input terminals;
   b) a controllable three-phase bridge with phase arms having an identical structure and each phase arm being formed by:
      an electronic control switch, which can be turned off and which governs the conductance state of the phase arm a positive input diode connected on a cathode side to the respective phase input terminal;

a positive output diode to whose anode an emitter of the electronic control switch and an anode of the positive input diode are connected;

a negative output diode connected on a cathode side to a collector of the electronic control switch and connected on a anode side to the negative output rail, and a negative input diode branching off from the respective phase input terminal and connected on a cathode side to the collector of the control switch;

c) at a positive output of the bridge circuit a current-stabilizing inductance is connected to a cathode side of the positive output diode of the three-phase bridge;

d) a step-up controller diode oriented in the direction of the output, is connected between a positive output capacitor terminal and a second terminal of the inductance, facing away from the three-phase bridge; and e) a step-up controller transistor branching off from an anode of the step-up controller diode, the step-up controller transistor being connected to the negative output voltage rail and remaining in the switched-off state in order to form an output voltage from the system which is less than the mean value of the maximum output voltage from the bridge circuit, wherein the three-phase bridge is being fully driven, via an appropriate duty ratio of the step-up controller transistor, in order to form a voltage which is above the mean value of the maximum output voltage.

2. The apparatus as claimed in claim 1, further comprising a freewheeling diode branching off from the negative output voltage rail, the freewheeling diode is connected in the forward direction to the cathode of the positive output diode of the three-phase bridge, wherein within freewheeling intervals no concatenated input voltages, which are produced between the input terminals, are passed to the output of the three-phase bridge, the freewheeling diode carries the entire current which is forced to flow by the inductance.

3. A method for controlling the apparatus as claimed in claim 1 or 2, wherein the associated electronic control switch remains switched on in intervals which are symmetrical around maxima of the input phase voltages and have an electrical width of 60°, and a sinusoidal power supply system current profile and a regulation of the output voltage is achieved by pulsing two other phases, so that, in comparison to simultaneous pulsing of all the phases, the switching power loss is reduced and control of the system is simplified.

4. A method for controlling the apparatus as claimed in claim 1 or 2, comprising:

operating the electronic control switche in the three-phase bridge and the step-up controller transistor at the same clock frequency, and synchronizing the switching of these two converter parts such that the intervals during which the step-up controller is switched on are located symmetrically about the freewheeling intervals of the three-phase bridge, with no voltage and hence no current change occurring on the inductance for the coverage of both switching states, thus minimizing the switching-frequency fluctuation of the output current from the three-phase bridge.

* * * * *